E. C. CLAPP.
ADJUSTABLE LAMP BRACKET FOR AUTOMOBILES.
APPLICATION FILED OCT. 25, 1912.
1,078,831.
Patented Nov. 18, 1913.
2 SHEETS—SHEET 1.
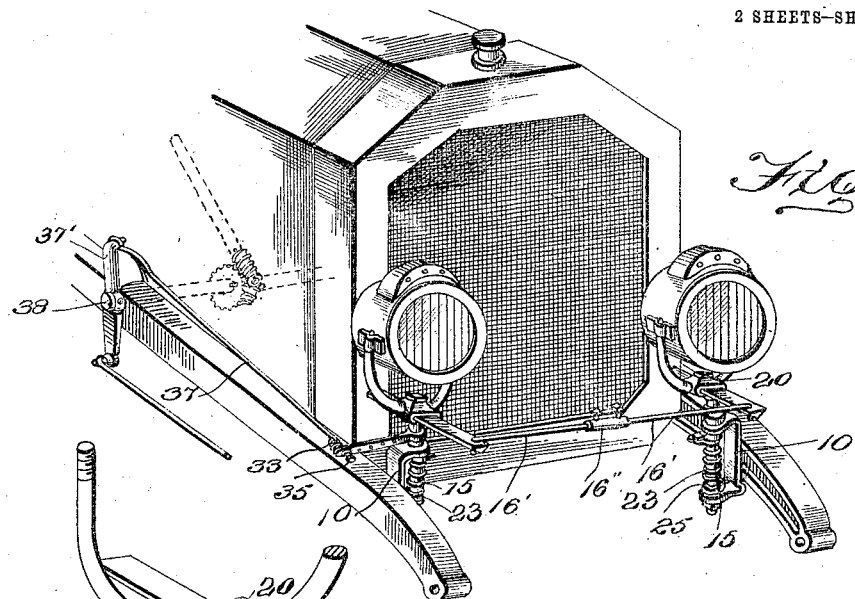
Inventor
Edward C. Clapp E. C. CLAPP.
ADJUSTABLE LAMP BRACKET FOR AUTOMOBILES.
APPLICATION FILED OCT. 25, 1912.
1,078,831.
Patented Nov. 18, 1913.
2 SHEETS—SHEET 2.
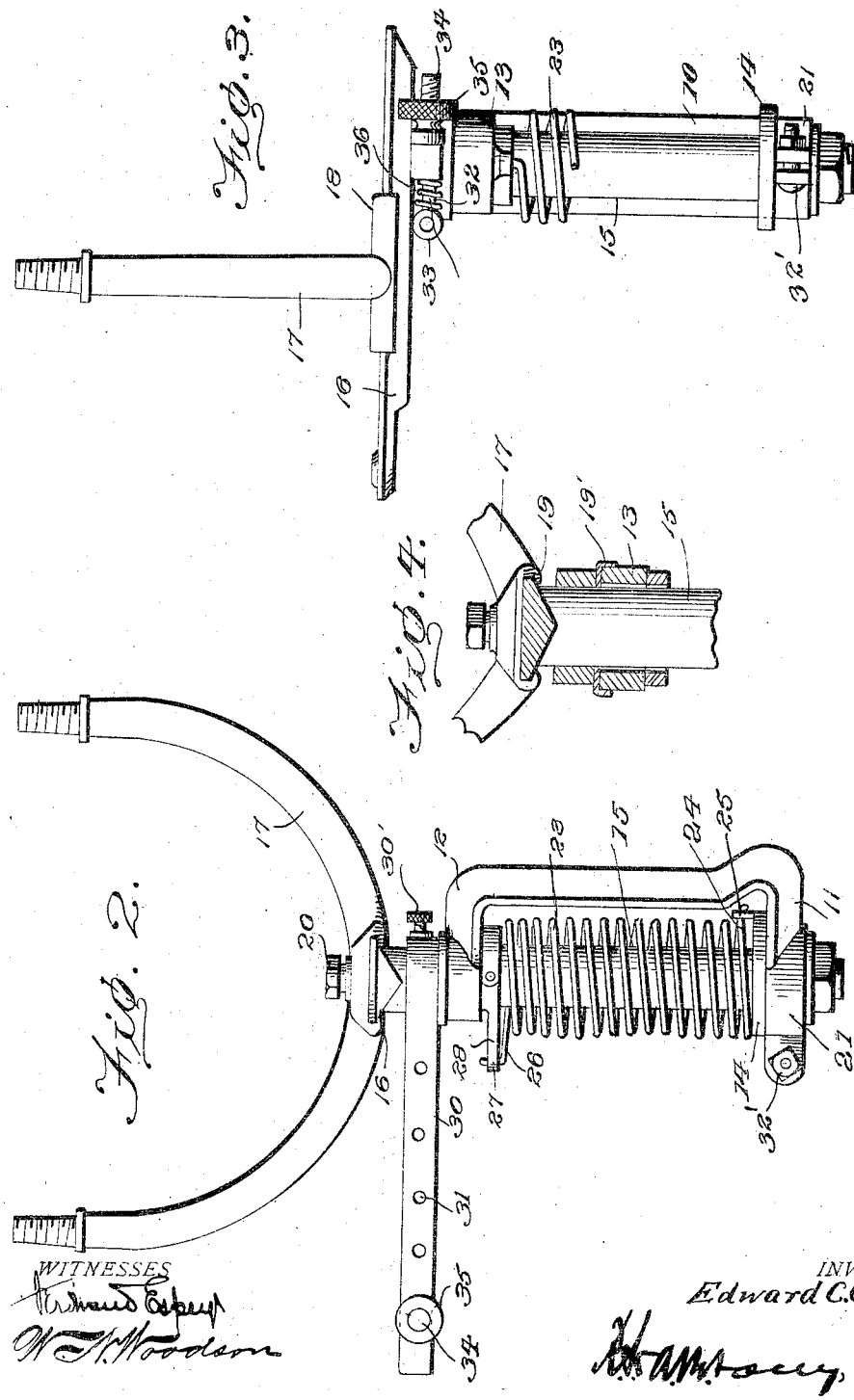
WITNESSES
INVENTOR
Edward C. Clapp.
Attorneys.

UNITED STATES PATENT OFFICE.

EDWARD C. CLAPP, OF YORK, NEW YORK.

ADJUSTABLE LAMP-BRACKET FOR AUTOMOBILES.

1,078,831. Specification of Letters Patent. Patented Nov. 18, 1913.

Application filed October 25, 1912. Serial No. 727,814.

*To all whom it may concern:*

Be it known that I, EDWARD C. CLAPP, citizen of the United States, residing at York, in the county of Livingston and State of New York, have invented certain new and useful Improvements in Adjustable Lamp-Brackets for Automobiles, of which the following is a specification.

This invention relates to an improvement in lamp brackets.

The primary object of the invention is to provide a construction in which the lamp brackets of a vehicle may be actuated by the movement of the steering shaft, the lamp supporting members being normally maintained in a position to direct the light in the front of the car.

A further object of the invention is to provide resilient means for maintaining the lamp brackets in a position to direct the light in front of the vehicle.

Another object of the invention is to provide a construction in which the tension of the resilient means which supports the bracket may be regulated.

A still further object of the invention is to provide a construction in which the bracket may be supported at different points on the frame of the vehicle, the construction allowing for variations in the design of the vehicle.

A still further object of the invention is to provide means whereby the movement imparted to the lamps by the steering shaft may be regulated.

In the drawings: Figure 1 is a perspective view showing the brackets supported by a motor vehicle; Fig. 2 a front elevation of the bracket; Fig. 3 a side elevation of the bracket; Fig. 4 a view partly in section showing the manner in which the lamp supporting fork is disposed on the fork seat; Fig. 5 a top plan view; Fig. 6 is a detail view of one of the lamp brackets. Fig. 7 is a view showing a slightly modified form of connection between the steering shaft and the arm on the lamp supporting member.

In the drawings 10 designates a substantially U-shaped bracket which is supported by the vehicle at any suitable point, the point of support depending upon the design of the vehicle. The portions 11 and 12 of said bracket support bearings 13 and 14. A standard 15 is supported by said bearings, the terminal of said standard being formed integral with or secured to a fork seat 16.

The lamp supporting forks 17 are formed with the seat engaging portion 18, the edges 19 of which embrace the fork support which is preferably substantially triangular in cross section. A set screw 20 passes through said seat engaging portion, contacting with the fork support 16 to hold the forks rigidly on the fork support. It will be noted by this construction that the forks are adjustable longitudinally of the fork seat. The terminals of the fork seats are apertured and a rod 16' is connected to each of said seats, the apertures in the seats receiving the terminals of the rods. The ends of the rods remote from the fork seats are received by a sleeve 16'', thus providing for the simultaneous movement of the lamps and adjustment between the same.

The member 21, which is supported by the lower terminal of the bracket, is provided with extensions which are connected by the set-screw 32'. The bearing 14 is embraced by the annular collar 21, and is held against rotation by drawing the extensions of said collar together by means of the screw 32'. Thus the bearing 14 may be adjusted with respect to the collar 21 for a purpose which will be hereinafter described.

A spring 23 is coiled about the standard 15, the lower terminal 24 of said spring extending within an aperture of the lug 25 arranged on the lower bearing 14. The upper terminal 26 of the spring extends within the aperture 27 formed in the arm 28 of the collar 29 which is supported adjacent the upper end of the standard 15 below the portion 12 of the bracket 10. The tendency of this spring is to maintain the lamp supporting forks in a position to direct the light from the lamps directly in front of the vehicle, it being noted that the bearing 14 of the collar 11 may be adjusted to regulate the tension of said spring. This adjustment is secured by loosening the screw 32' and rotating the bearing 14. After the bearing has been adjusted, the screw 32' is tightened, the collar snugly embracing the bearing and preventing its rotation.

A lever 30 is connected to the standard 15 at a point below the fork seat. This lever is connected to only one of the lamps and while it is shown as connected to the upper portion of the standard it will operate as effectually if connected to the lower terminal of said standard. The lever 30 is provided with a plurality of apertures 31 which receive a screw 32 one terminal of which is formed with an eye 33, the threaded portion 34 of the screw receiving a nut 35. A coil spring 36 embraces the screw and is disposed between the eye 33 and the arm or lever 30, maintaining the nut 35 in contact with the lever. A link 37 is connected to the eye 33, the movement of this link actuating the arm 30 to transmit movement to the standard 15 of the lamp to which it is attached, this movement being transmitted to the other lamp by means of the connecting rods 16'. The link 37 may be operated by the steering mechanism in any manner which may be found convenient, the specific form of connection depending upon the construction of the vehicle. Preferably this link 37 is connected to a lever 37' which is mounted on the steering shaft 38. The lever is illustrated in the drawing as mounted on the shaft 38, the upper terminal of the lever being connected to the link 37. It will be noted that a flexible connection may be used instead of the link 37 and the connection passed over suitable pulleys when the steering shaft is inaccessible for such a connection as shown in the drawing. When a sector is used, as illustrated in Fig. 7, the flexible connector 39 passes over sector 40, its terminal 41 being connected to a loop 42 formed integral with the sector. The lever 38 illustrated in Fig. 1 comprises two arms either of which may be connected with the arm of the lamp support, depending upon the location of said arm on the support.

It will be noted that the construction is such that by slight variations in the connection between the steering mechanism and the lamp supporting member, the device is applicable to any type of vehicle, and while the device is illustrated as connected to a lever mounted on the steering shaft, the present invention is not limited to this construction, any suitable arrangement being employed for transmitting the movement of the steering mechanism to the lamps.

When the steering shaft is actuated, in the construction illustrated, the rod 37 imparts movement to the lever 30. The standard 15 is thus rotated consonantly with the movement of the steering mechanism, the lamps thus being moved to compensate for the turning of the wheel. This rotation of the standard 15 causes the compression of the spring 23, it being noted that when the spring expands it will cause the standard 15 to assume its normal position. Thus the lamps are moved by the operation of the steering shaft and returned to their normal positions without the use of a direct connection between the rod and the lamp supporting forks. It will be noted by this construction that the spring will take up lost motion and will assure the movement of the lamps without violently jerking the same, which prevents the rays from being projected steadily as the lamp turns.

Attention is called to the fact that the arc in which the lamps turn may be regulated by adjusting the screw 32 longitudinally of the arm 30. The lamps receive their greater movement when the screw is connected to the inner terminal of the arm 30, the arc being shortened as the adjusting screw is brought nearer to the standard 15.

The many advantages of a construction of this character will be clearly apparent as it will be noted that the lamps are simultaneously actuated to follow the movement of the wheel, the return movement of the lamps while being accomplished without a connection with the steering shaft, being steady, thereby preventing the jerking of the lamps as they assume their normal positions.

Particular attention is called to the fact that the device is applicable to any form of vehicle which carries one or more lamps and that suitable connections may be made for operating one lamp as well as a number of lamps. It will also be seen that various connections may be made between the lamps and the steering mechanism and that the device is not restricted to use with any particular type of vehicle.

Having described the invention, what I claim is:

1. A lamp bracket for vehicles comprising a member secured to the vehicle, said member being formed with extensions disposed at right angles to its body portion, an adjustable clamp carried by one of said extensions, a bearing embraced by said clamp, a standard supported for rotation by said extensions, a spring embracing the standard intermediate the extensions, one terminal of the spring being connected to said bearing, a collar mounted on the standard, the other terminal of said spring being connected to the collar, and an operative connection between said standard and the steering mechanism of the vehicle, said standard constituting a lamp support.

2. A lamp bracket for vehicles comprising a member secured to the vehicle, said member being formed with extensions disposed at right angles to its body portion, an adjustable clamp carried by one of said extensions, a bearing embraced by said clamp, a standard supported for rotation by said extensions, a spring embracing the standard intermediate the extensions, one terminal of the spring being connected to said bearing, a collar mounted on the standard, the other terminal of said spring being connected to the collar, an operative connection between said standard and the steering mechanism of the vehicle, said standard constituting a lamp support, and means for regulating the degree of movement of the standard.

3. A lamp bracket for vehicles comprising a member secured to the vehicle, said member being formed with extensions disposed at right angles to its body portion, an adjustable clamp carried by one of said extensions, a bearing embraced by said clamp, a standard supported for rotation by said extensions, a spring embracing the standard intermediate the extensions, one terminal of said spring being connected to said bearing, a collar mounted on the standard, the other terminal of said spring being connected to the collar, and an arm mounted on the standard and having an adjustable connection with the steering mechanism of the vehicle, whereby the degree of movement of the standard may be regulated.

4. A lamp bracket for vehicles comprising a member supported by the vehicle, said member being formed with extensions disposed in vertical alinement, a bearing adjustably mounted in one of said extensions, a standard supported for rotation by said extension, said standard passing through said bearing and projecting through the other extension, a spring embracing said standard, one terminal of said spring being connected to said bearing, the other terminal of said spring being connected to the standard, the standard constituting a lamp support, and an operative connection between said standard and the steering mechanism of the vehicle.

5. A lamp bracket for vehicles comprising a member supported by the vehicle, said member being formed with extensions, disposed in vertical alinement, a bearing adjustably mounted in one of said extensions, a standard supported for rotation by said extension, said standard passing through said bearing and projecting through the other extension, a spring embracing said standard, one terminal of said spring being connected to said bearing, the other terminal of said spring being connected to the standard, the standard constituting a lamp support, and an adjustable connection between said standard and the steering mechanism of the vehicle.

In testimony whereof I affix my signature in presence of two witnesses.

EDWARD C. CLAPP. [L. S.]

Witnesses:
    MAIZIE PATTEN,
    EVELYN M. SIMPSON.